(12) United States Patent
Matsuoka et al.

(10) Patent No.: US 8,004,424 B2
(45) Date of Patent: Aug. 23, 2011

(54) DRIVING ASSIST DEVICE FOR VEHICLE

(75) Inventors: Satoru Matsuoka, Hiroshima (JP); Haruhisa Kore, Hiroshima (JP); Koji Iwase, Hiroshima (JP); Takanori Kume, Hiroshima (JP)

(73) Assignee: Mazda Motor Corporation (JP)

( * ) Notice: Subject to any disclaimer, the term of this patent is extended or adjusted under 35 U.S.C. 154(b) by 401 days.

(21) Appl. No.: 12/180,727

(22) Filed: Jul. 28, 2008

(65) Prior Publication Data

US 2009/0058678 A1    Mar. 5, 2009

(30) Foreign Application Priority Data

Aug. 27, 2007  (JP) ................................ 2007-219473

(51) Int. Cl.
*G08G 1/00* (2006.01)
*B60Q 1/00* (2006.01)

(52) U.S. Cl. .......................... 340/901; 340/904; 340/435

(58) Field of Classification Search .................. 340/439, 340/461, 438, 901–904, 691.6, 932.2, 435–436; 701/301, 302; 345/7–9; 349/11
See application file for complete search history.

(56) References Cited

U.S. PATENT DOCUMENTS

| | | | | |
|---|---|---|---|---|
| 5,457,439 A * | 10/1995 | Kuhn | ............................. | 340/435 |
| 7,734,419 B2 * | 6/2010 | Kondoh | ........................ | 701/301 |
| 2004/0193331 A1 * | 9/2004 | Kashiwada et al. | .............. | 701/1 |
| 2006/0164219 A1 * | 7/2006 | Knoll | ............................. | 340/435 |
| 2007/0076526 A1 * | 4/2007 | Aikyo et al. | .................. | 367/128 |
| 2007/0106475 A1 * | 5/2007 | Kondoh | ........................ | 701/301 |
| 2007/0210906 A1 * | 9/2007 | Knoll et al. | .................... | 340/461 |
| 2008/0122939 A1 * | 5/2008 | Hirai | .......................... | 348/222.1 |
| 2009/0303078 A1 * | 12/2009 | Mochizuki et al. | ........... | 340/901 |

FOREIGN PATENT DOCUMENTS

| | | |
|---|---|---|
| DE | 10253510 A1 | 5/2004 |
| DE | 102006012773 A1 | 11/2006 |
| DE | 102005042912 A1 * | 3/2007 |
| EP | 1783531 A1 | 5/2007 |
| JP | 2002-074594 | 3/2002 |
| JP | 2002074594 A * | 3/2002 |
| JP | 2005-0251111 | 9/2005 |

OTHER PUBLICATIONS

Extended European Search Report dated Jun. 23, 2009; Application No. 08014028.8-2421.

* cited by examiner

*Primary Examiner* — Brian A Zimmerman
*Assistant Examiner* — An T Nguyen
(74) *Attorney, Agent, or Firm* — Studebaker & Brackett PC; Donald R. Studebaker

(57) ABSTRACT

A driving assist device for a vehicle of the present invention, comprising an object detection device to detect an object to be recognized around the vehicle, an eyes-direction specification device to specify a direction of driver's eyes, and a mark indication device to indicate a specified-shape mark at a specified portion of a windshield that is located in the direction of the driver's eyes specified by the eyes-direction specification device and then to indicate the specified-shape mark in such a manner that the mark overlaps with the object. Accordingly, the driver can be properly made recognize any object in danger even in case the driver's eyes are not directed to such object.

7 Claims, 10 Drawing Sheets

Priority (Degree of Danger) Determination Table

|  | Pedestrian | Vehicle | Traffic Signal | Cross Walk |
|---|---|---|---|---|
| ~10m | 1 | 2 | 7 | 8 |
| 10m~20m | 3 | 4 | 9 | 10 |
| 20m~30m | 5 | 6 | 11 | 12 |
| 30m~50m | 13 | 14 | 15 | 16 |

FIG. 4

DRIVING ASSIST DEVICE FOR VEHICLE

BACKGROUND OF THE INVENTION

The present invention relates to a driving assist device for a vehicle.

An automobile industry has recently developed various technologies and equipments to improve the safety of vehicles in order to achieve a safe automobile society.

Japanese Patent Laid-Open Publication No. 2000-251111, for example, discloses a technology of a monitoring control of an object in front of driver's eyes which uses marking. Japanese Patent Laid-Open Publication No. 2002-074594, meanwhile, discloses another technology for a proper indication of a pedestrian in danger of hitting or the like.

The technologies of the above-described publications could not properly make a driver recognize an object (a pedestrian, etc.) in danger of hitting or the like in case the driver's eyes were not directed to the object.

SUMMARY OF THE INVENTION

Accordingly, an object of the present invention is to provide a driving assist device for a vehicle which can properly make the driver recognize any object in danger even in case the driver's eyes are not directed to such object.

According to the present invention, there is provided a driving assist device for a vehicle, comprising an object detection device to detect an object to be recognized around the vehicle, an eyes-direction specification device to specify a direction of driver's eyes, and a mark indication device to indicate a mark with a specified shape on a windshield when the object is detected by the object detection device, wherein the mark indication device is configured to indicate the specified-shape mark at a specified portion of the windshield that is located in the direction of the driver's eyes specified by the eyes-direction specification device and then to indicate the specified-shape mark in such a manner that the mark overlaps with the object.

According to the driving assist device for a vehicle of the present invention, when the object (such as a pedestrian or another vehicle in danger of hitting) is detected, the specified-shape mark is indicated at the specified portion of the windshield that is located in the direction of the driver's eyes. Then, the specified-shape mark is changed in indication position in such a manner that the mark finally overlaps with the object. Accordingly, the driver can be made properly recognize the object even in case the driver's eyes are not directed to such object.

According to an embodiment of the present invention, the mark indication device is configured to indicate the specified-shape mark repeatedly in such a manner that the mark indicated repeatedly moves from a position of the driver's-eyes direction specified by the eyes-direction specification device to a position of the object indicated. Thereby, the driver can be made recognize the object surely.

According to another embodiment of the present invention, the mark indication device is configured to continue the repeated indication of the specified-shape mark until a vehicle driver gazes at the object. Thereby, the driver can be made recognize the object surely.

According to another embodiment of the present invention, the mark indication device is configured to change shape of the specified-shape mark to be indicated in accordance with a kind of the object. Thereby, the driver can recognize the kind of the object promptly.

According to another embodiment of the present invention, the mark indication device is configured to change at least one of shape, color and moving speed of the specified-mark to be indicated in accordance with a degree of danger of the object. Thereby, the driver can recognize the kind of the object promptly.

According to another embodiment of the present invention, the object detected by the object detection device is at least one of a pedestrian, another vehicle, a traffic signal, an intersection, and a cross walk. Thereby, any object in danger can be picked up properly.

According to another embodiment of the present invention, in case a plurality of objects are detected by said object detection device, the mark indication device is configured to indicate the specified-shape mark for a plurality of objects in order of priority of indication of objects. Thereby, the driver can be made recognize the particular object having the higher priority promptly.

Other features, aspects, and advantages of the present invention will become apparent from the following description which refers to the accompanying drawings.

BRIEF DESCRIPTION OF THE DRAWINGS

FIG. 4 is an exemplified table of a priority (degree of danger) determination.

DETAILED DESCRIPTION OF THE INVENTION

Hereinafter, preferred embodiments of the present invention will be described referring to the accompanying drawings.

Embodiment 1

Figure 1A:
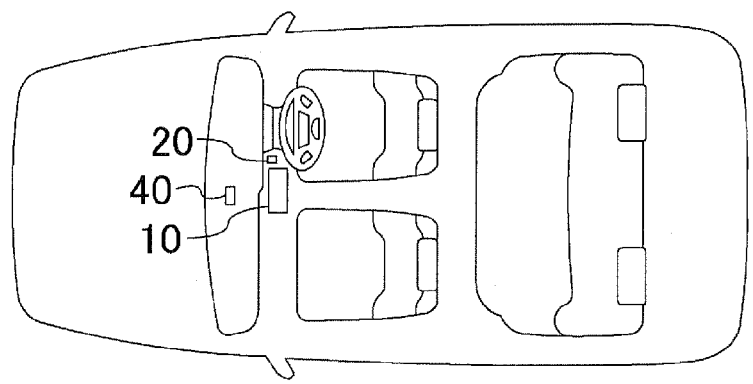
FIGS. 1A and 1B are diagrams showing constitution of a driving assist device for a vehicle according to a first embodiment of the present invention.
Figure 1B:
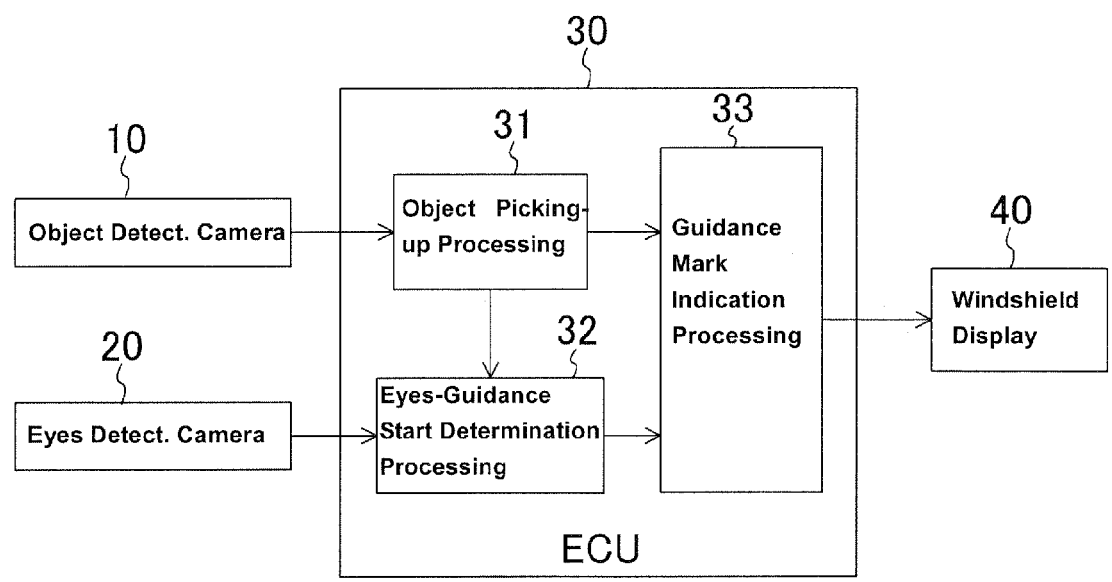

A system constitution of a driving assist device for a vehicle according to a first embodiment of the present invention is shown in FIGS. 1A and 1B. The driving assist device for a vehicle comprises a camera for object detection 10, a camera for eyes detection 20, an ECU (Electronic Control Unit) 30, and a windshield display 40. Herein, FIGS. 1A and 1B only show vehicle components relating to the driving assist device for a vehicle according to the present embodiment.

The camera for object detection 10, which is disposed at a roof front-end portion inside the vehicle or a door mirror, picks up a surrounding image of the vehicle. This camera may be comprised of a single camera or a stereo camera. Any surrounding object of the vehicle can be detected based on the image picked tip by the camera for object detection 10. The object may be detected further based on information from a radar (not illustrated) which is disposed near a front grille of a vehicle front portion. The camera for eyes detection 20, which is disposed at an instrument panel or on a dash board inside the vehicle, picks up an image of a driver's eye in a visible area or an infrared area. A direction of driver's eyes can be detected (specified) by the image picked up by the camera for eyes detection 20. The ECU 30 is comprised of a computer which performs various processing (object picking-up processing 31, eyes-guidance start determination processing 32, guidance-mark indication processing 33, etc.). The windshield display 40 indicates various kind of information, such as images, on a windshield of the vehicle.

Hereinafter, the operation of the above-described driving assist device for a vehicle will be described referring to a flowchart shown in FIG. 2.

In step ST100, an initialization processing (for resetting all flags) is executed. Then, respective input processing of sensors (the camera for object detection 10, etc.) is executed in step ST200.

Figure 3:
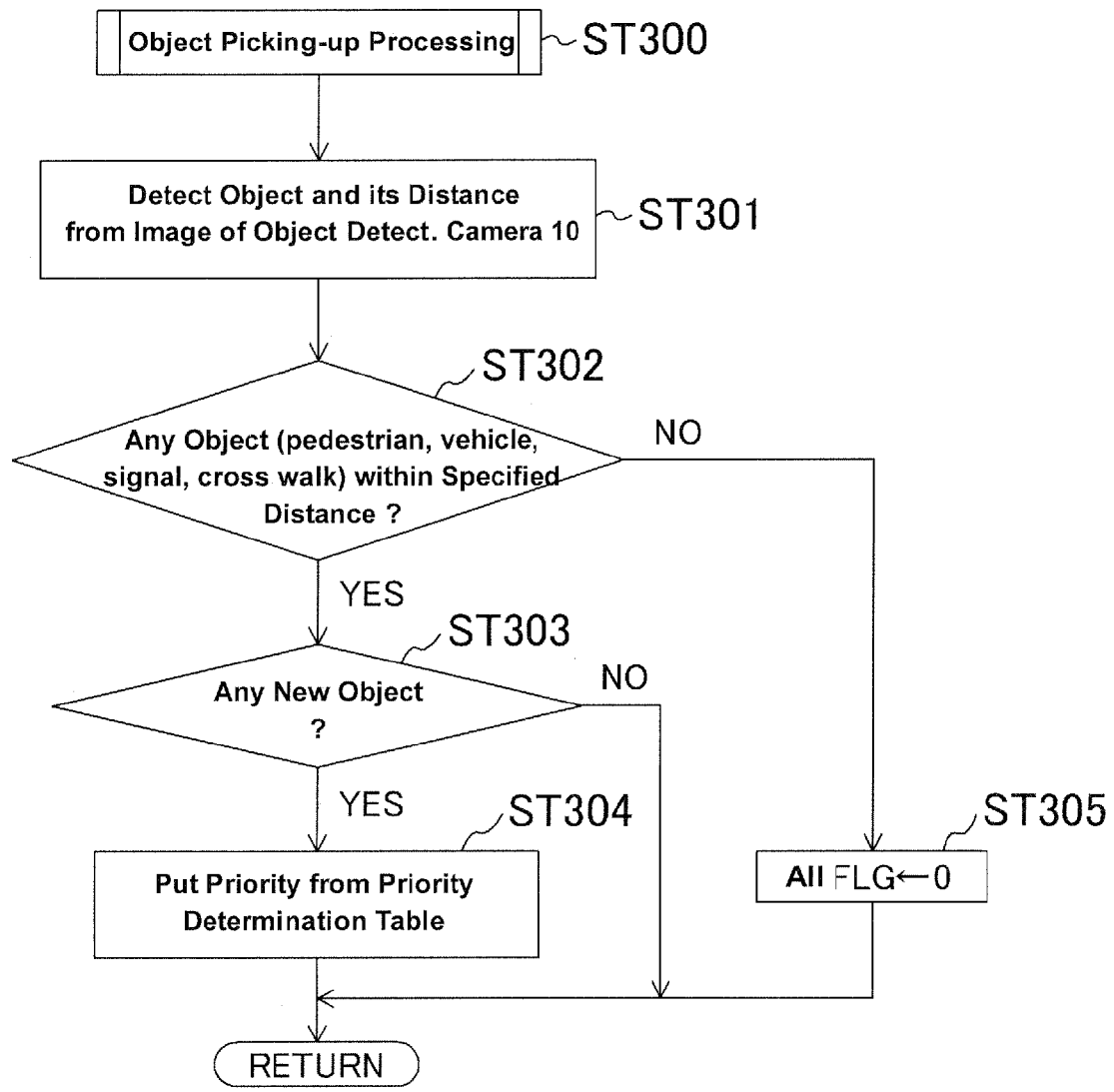
FIG. 3 is a flowchart showing a specific processing flow of an object picking-up processing ST300.

Subsequently, an object picking-up processing is executed in step ST300. A specific processing flow of this object picking-up processing ST300 is shown in FIG. 3.

In step ST301, the ECU 30 detects an object from the image picked up by the camera for object detection 10. In the present embodiment, the object detected is set to be a pedestrian, another vehicle, a traffic signal, an intersection, and a cross walk, each shape data of which has been memorized in the ECU 30. Any other object may be set if need be. The ECU 30 detects the object and the kind of the object from the image picked up by using a patter matching processing between the image picked up by the camera for object detection 10 and the above-described memorized shape data. Further, the ECU 30 calculates the distance from the vehicle to the detected object, moving direction and speed of the detected object and the like, based on the image from the camera for object detection 10 and information from the radar.

Next, the ECU 30 determines in step ST302 whether or not there exists any object detected in the step ST301 which is located within a specified distance from the vehicle. When there exists no such object (NO in the determination step ST302), the control sequence proceeds to step ST305, where all flags are reset.

Meanwhile, when there exists such object (YES in the step ST302), the control sequence proceeds to step ST303, where the ECU 30 determines whether or not there exists any new object among the objects which have been detected to be located within the specified distance in the step ST302.

When there exists such new object (YES in the determination step ST303), the control sequence proceeds to step ST304, where the ECU 30 puts a priority to the object based on a priority (degree of danger) determination table shown in FIG. 4. Herein, the value of priority is set in accordance with the kind of object (pedestrian, another vehicle, traffic signal, cross walk) and the distance between the object and the vehicle as shown in FIG. 4. The smaller the value of priority is, the higher the priority is. Herein, in case the object is pedestrian, another vehicle, the priority may be determined considering the moving direction, the moving speed.

Figure 5:
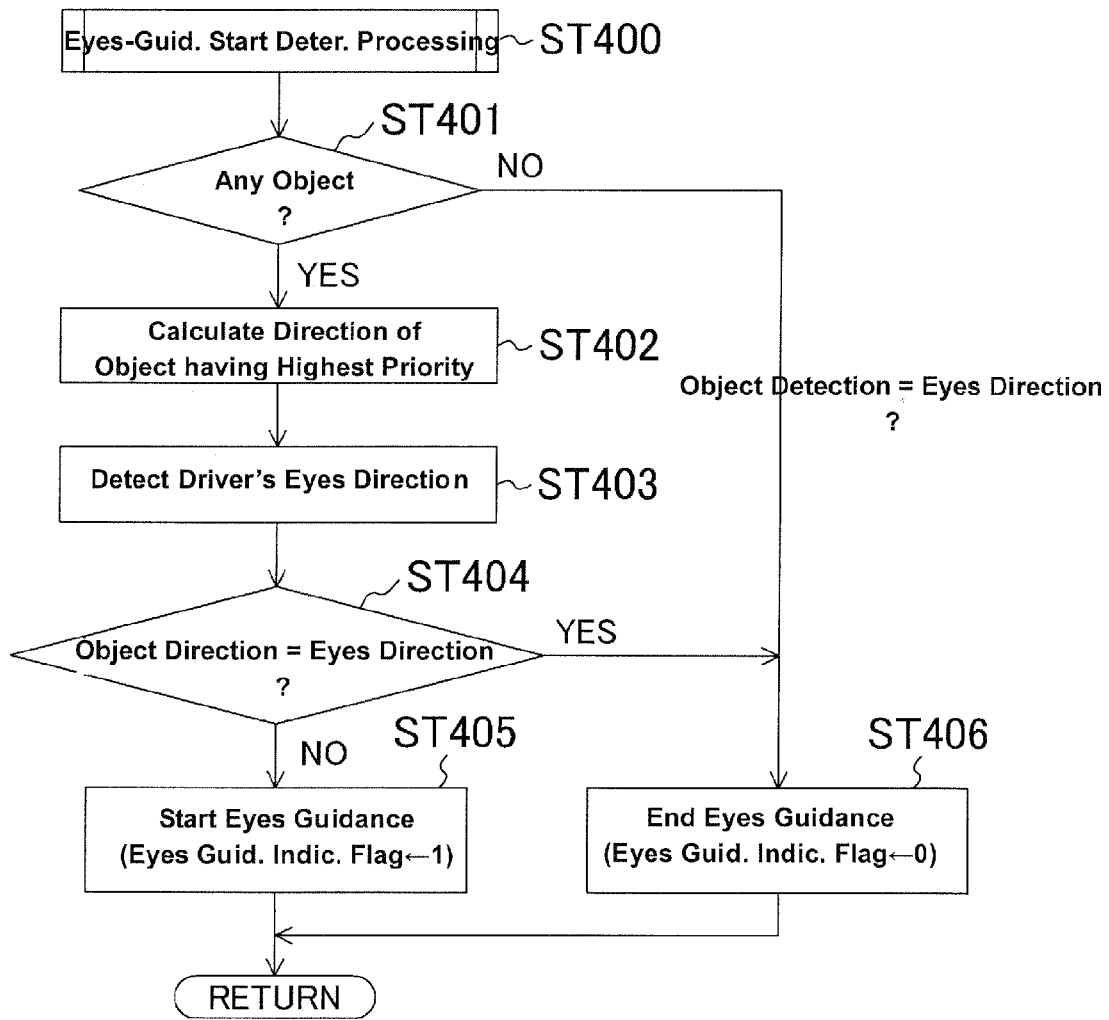
FIG. 5 is a flowchart showing a specific processing flow of an eyes-guidance start determination processing ST400.

Thus, the object picking-up processing ST300 is executed. Subsequently, an eyes-guidance start determination processing is executed in step ST400 shown in FIG. 2. FIG. 5 shows a specific processing flow of the eyes-guidance start determination processing ST400.

First, the ECU 30 determines in step ST401 whether or not there exists any object for the eyes-guidance start determination processing. When there exists no such object (NO in the determination step ST401), the control sequence proceeds to step ST406, where an eyes-guidance indication flag is set to 0, thereby ending eyes-guidance processing.

Meanwhile, when there exists such object (YES in the step ST401), the control sequence proceeds to step ST402, where the ECU 30 selects a specified object having the highest priority from the objects detected in the step ST302 and calculates the direction of location of this object when seen from the vehicle.

Then, the ECU 30 in step ST403 detects the eyes-direction of the driver in the vehicle. The eyes-direction may be detected directly by the eyes detection sensor (camera for eyes detection 20), or predicted by detecting the direction of a driver's head with a camera located in the vehicle (not illustrated).

In step ST404, the ECU 30 determines whether or not the direction of the object detected in the step ST402 and the eyes-direction calculated in the step ST403 are located within a specified range so that they can be considered to be an identical direction. For example, an angle $\alpha$ between the eyes-direction (vector) and the object direction (vector) is smaller than a specified angle $\beta$, it is determined that "they are the identical direction." To the contrary, the angle $\alpha$ is greater than the specified angle $\beta$, it is determined that "they are not the identical direction."

When it is determined in the step ST404 that "they are the identical direction (YES in the determination step ST404)," the control sequence proceeds to step ST406, where the ECU 30 sets the eyes guidance indication flag to 0, thereby ending the eyes-guidance processing.

Meanwhile, when it is determined in the step ST404 that "they are not the identical direction (NO in the step ST404)," the control sequence proceeds to step ST405, where the ECU 30 sets the eyes guidance indication flag to 1, thereby starting the eyes-guidance processing.

Figure 6:
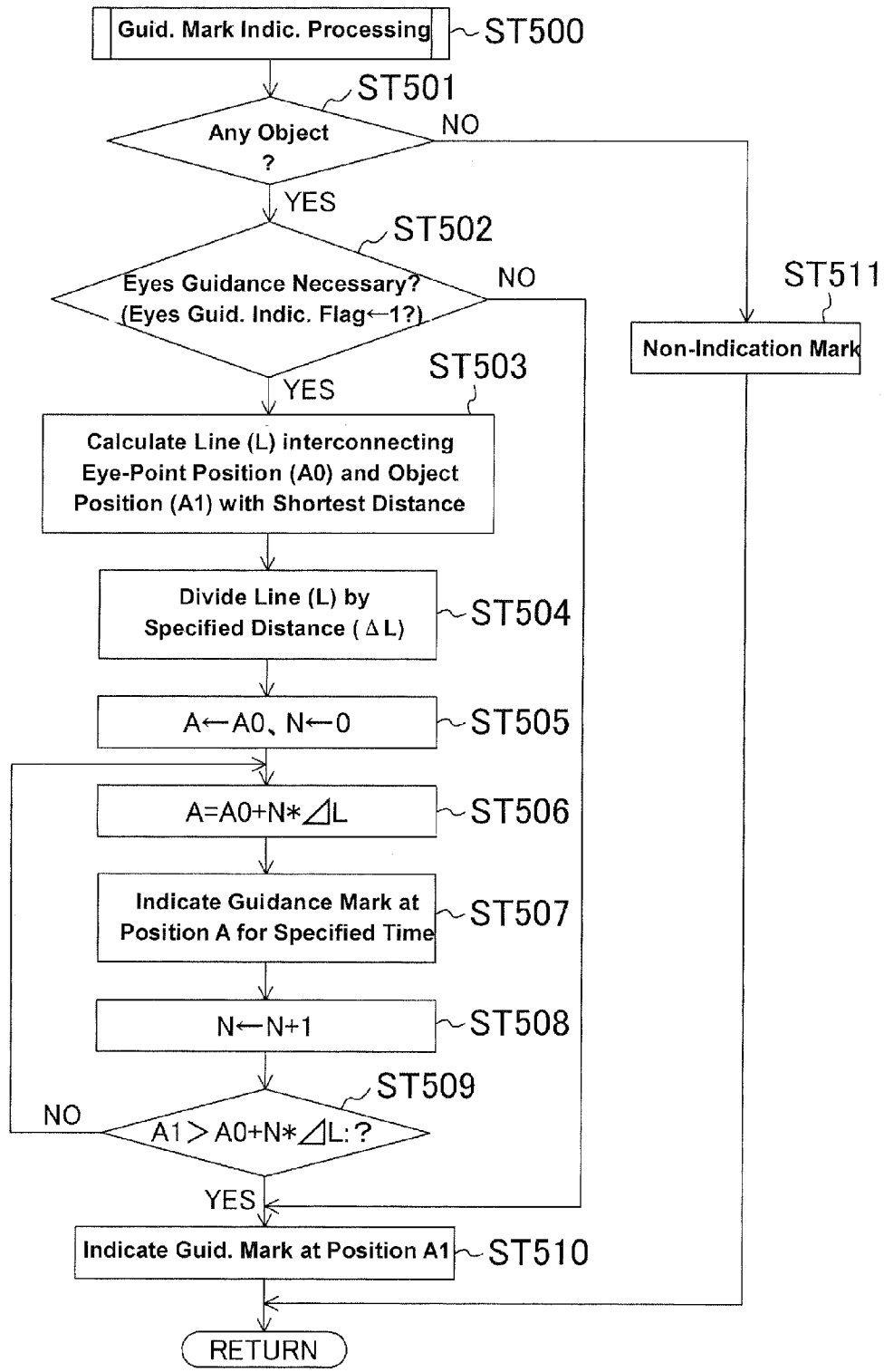
FIG. 6 is a flowchart showing a specific processing flow of a guidance-mark indication processing ST500.

Thus, the eyes-guidance start determination processing ST400 is executed. Subsequently, a guidance-mark indication processing is executed in step ST500 shown in FIG. 2. FIG. 6 shows a specific processing flow of the guidance-mark indication processing ST500.

The ECU 30 determines in step ST501 whether there exists any object for the guidance-mark indication processing or not.

When there exists no such object (NO in the determination step ST501), the control sequence proceeds to step ST511, where the ECU 30 sets the guidance mark to non-indication, thereby ending the eyes-guidance processing. Meanwhile, when there exists such object (YES in the step ST501), the control sequence proceeds to step ST502, where the ECU 30 checks the eyes-guidance indication flag. When the eyes-guidance indication flag is 1, it proceeds to step ST503. When the eyes-guidance indication flag is 0, it proceeds to step ST510.

Figure 7:
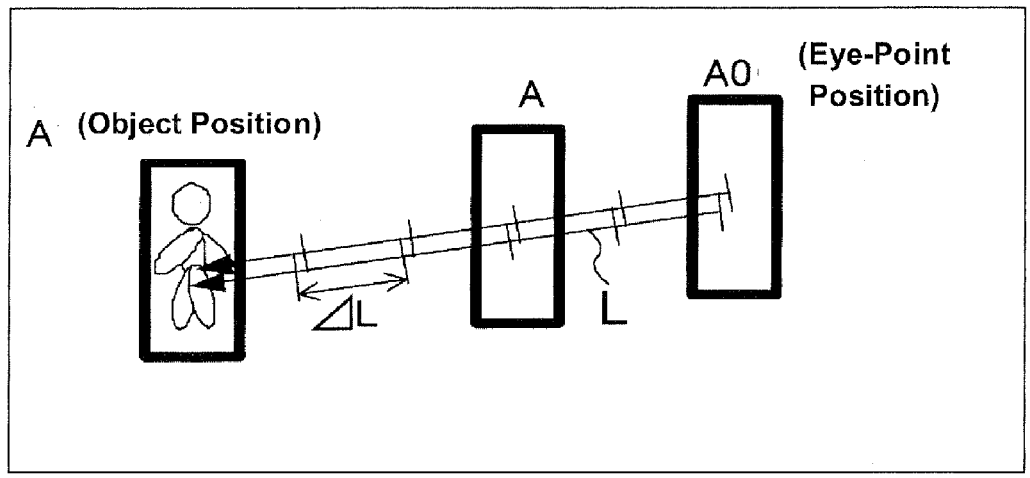
FIG. 7 is an example of a guidance mark indicated on a windshield display.

When the eyes-guidance indication flag is 1, the ECU 30 in the step ST503 obtains an eye-point position (A0) of the driver in the indication area on the windshield by the windshield display 40 based on the eyes direction calculated in the step ST403. Also, the ECU 30 obtains the position (A1) of the object having the highest priority in the indication area on the windshield by the windshield display 40 based on the direction of the object having the highest priority calculated in the step ST402. And, the ECU 30 calculates a line (L) that interconnects the eye-point position (A0) and the object's position (A1) with the shortest distance as shown in FIG. 7.

Then, the ECU 30 divides the above-described line (L) by a specified distance (ΔL) in step ST504. The value of ΔL depends on the degree of danger (priority) of the object so that the higher the degree of danger (priority) is, the greater the value of ΔL.

Next, the ECU 30 sets A to A0, N to 0, respectively (ST505), and conducts a calculation of A=A0+N×ΔL (ST506).

Figure 8:
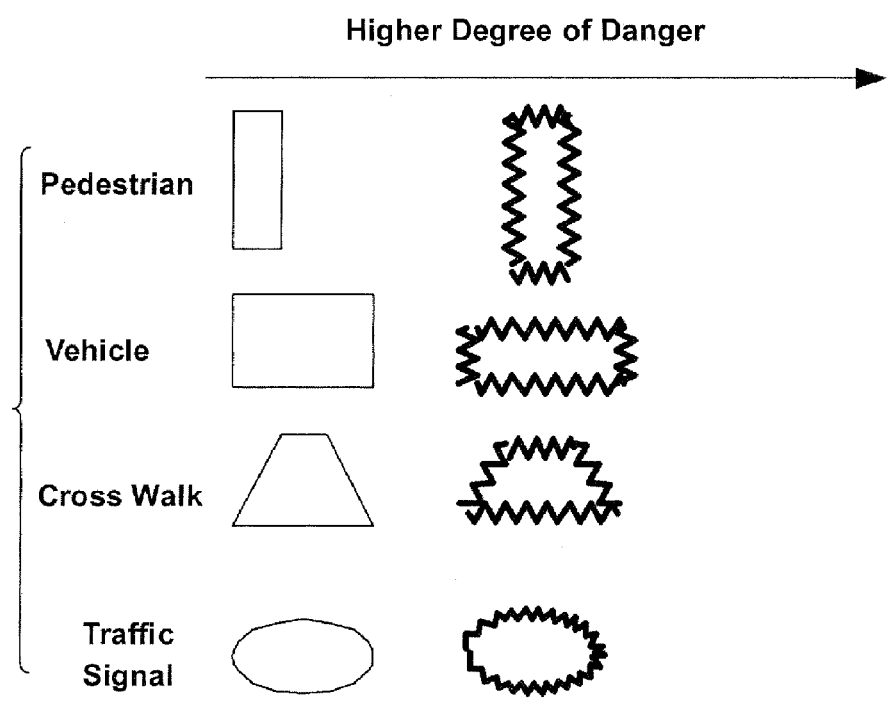
FIG. 8 is an example of guidance marks which are different from one another in accordance with a kind and a degree of danger of an object.

The ECU 30 in step ST507 commands the windshield display 40 to indicate the guidance mark at the position A which was obtained in the step ST506 for a specified time. In response to this, the windshield display 40 indicates the guidance mark at a position corresponding to the above-described position A in the indication area on the windshield for a specified time. Accordingly, at first the guidance mark is indicated for the specified time at the driver's eye-point position (A0). Herein, the specified time may be set to 1-2 seconds, for example. Also, as shown in FIG. 8, the guidance mark may be changed according to the kind of the object, or the degree of danger (priority). Further, the shape, boldness, color, moving speed or the like of the guidance mark may be changed according to the degree of danger (priority).

Next, the ECU 30 lets N to be increment (ST508), then determines whether A1>A0+N×ΔL is met or not (ST509). This determination is the one as to whether the next-time indication position of the guidance mark A (=A0+N×ΔL) has reached to the indication position A1 of the object or not.

When it is determined that A1>A0+N×ΔL is not met (NO in the step ST509), the processing of the steps ST506-ST508 are executed again. In this case, N has been increment, so the guidance mark is indicated at a position (A) which is closer to the object by ΔL than the previous indicated position (see FIG. 7).

Through repeated processing of the steps ST506-ST509, the guidance mark originally indicated at the driver's eye-point position (A0) on the windshield is changed in indication position gradually by the specified distance (ΔL) toward the object's position (A1) (see FIG. 7).

Meanwhile it is determined that A1>A0+N×ΔL is met (YES in the step ST509), the control sequence proceeds to step ST510, where the ECU 30 commands the windshield display 40 to indicate the guidance mark at the object's position (A1). In response to this, the windshield display 40 indicates the guidance mark at a position corresponding to the object's position (A1) in the indication area on the windshield (see FIG. 7).

According to the above-described guidance-mark indication processing ST500, the guidance mark is indicated at the driver's eye-point position (A0) on the windshield first, then the indication position of the guidance mark is changed by the specified distance (ΔL) toward the object's position (A1), and finally the guidance mark is indicated at the object's position (A1) so as to overlap with it (see FIG. 7).

According to the present embodiment, when the object (pedestrian, another vehicle in danger of hitting or the like) is detected, the guidance mark is indicated at the specified portion of the windshield that is located in the direction of the driver's eyes. Then, the guidance mark is changed in indication position in such a manner that the guidance mark overlaps with the object finally. Accordingly, the driver can be made properly recognize the object even in case the driver's eyes are not directed to such object.

Figure 2:
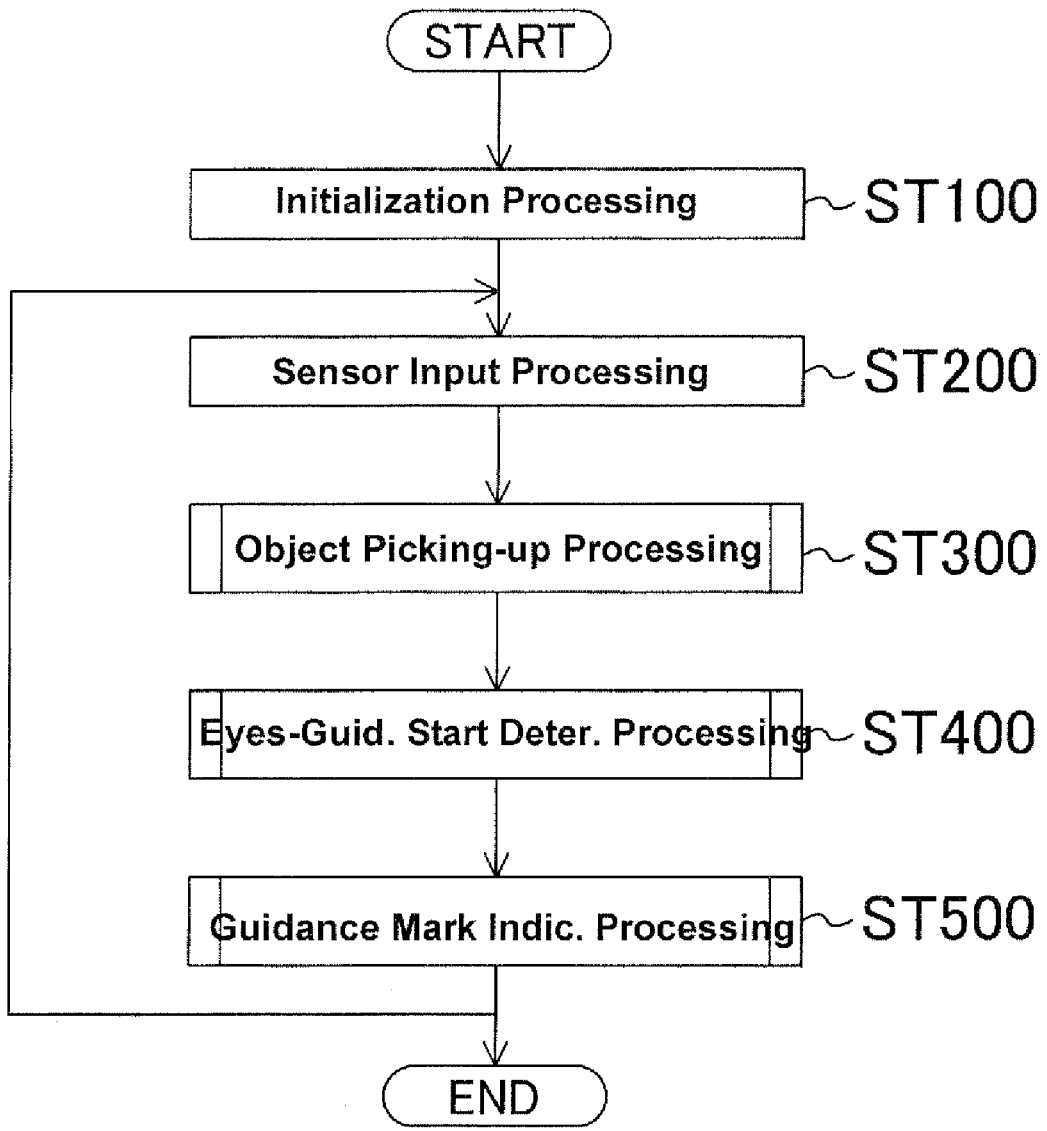
FIG. 2 is a flowchart showing an operation flow of the driving assist device for a vehicle according to the first embodiment of the present invention.

Further, according to the present embodiment, the sensor input processing ST200, the object picking-up processing ST300, the eyes-guidance start determination processing ST400, and the guidance-mark indication processing ST500 are repeated as shown in FIG. 2. And, the eyes-guidance indication flag is set to 1 unless the object's direction and the driver's eyes-direction are located within the specified range and the identical direction (ST404, ST405 of FIG. 5), and the guidance-mark moving indication processing (ST503-ST510 of FIG. 6) are repeated. Thus, the moving indication of the guidance mark is continued until the vehicle's driver gazes at the object, thereby the driver can be made recognize the object surely.

Embodiment 2

The above-described first embodiment shows the example in which only one object having the highest priority is selected from the objects detected, and the indication of the guidance mark is conducted for this object. However, a plurality of objects may be selected and the indication of the guidance mark may be conducted for the objects in order of priority (degree of danger). Hereinafter, this example in which two objected are selected will be described.

The whole processing is substantially the same as the one of the first embodiment shown in FIG. 2. Differences are concrete processing in the eyes-guidance start determination processing ST400 and the guidance-mark indication processing ST500. The differences will be described.

Figure 9:
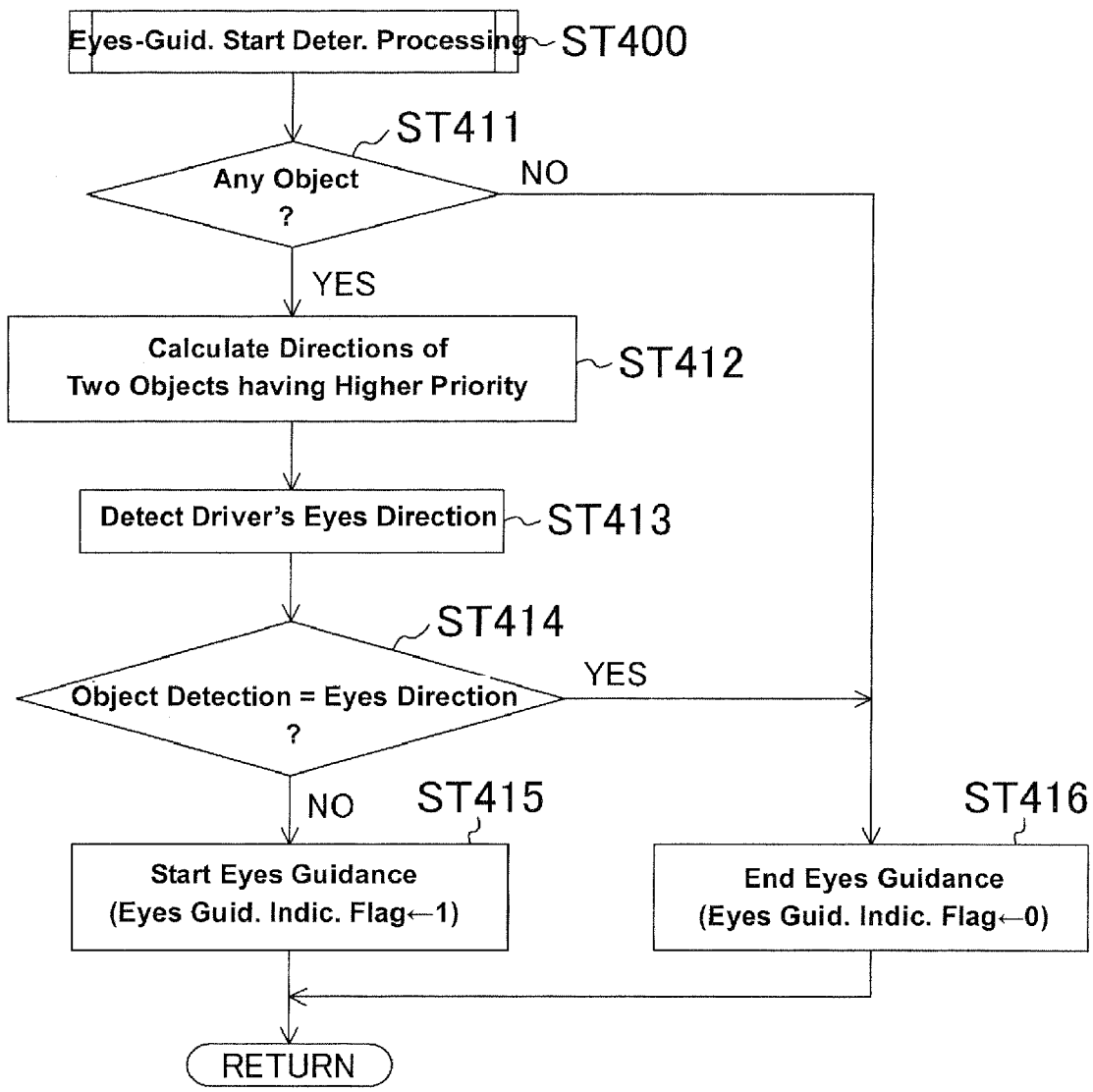
FIG. 9 is a flowchart showing a specific processing flow of an eyes-guidance start determination processing ST400 according to a second embodiment of the present invention.

The concrete processing flow of the eyes-guidance start determination processing ST400 of the present embodiment is shown in FIG. 9.

First, the ECU 30 determines in step ST411 whether or not there exists any object for the eyes-guidance start determination processing. When there exists no such object (NO in the determination step ST411), the control sequence proceeds to step ST416, where an eyes-guidance indication flag is set to 0, thereby ending eyes-guidance processing.

Meanwhile, when there exists such object (YES in the step ST411), the control sequence proceeds to step ST412, where the ECU 30 selects an object having the highest priority and another object having the second highest priority from the objects detected in the step ST302 and calculates respective directions of location of these two objects when seen from the vehicle.

Then, the ECU 30 in step ST413 detects the eyes-direction of the driver of the vehicle. The eyes-direction may be detected directly by the eyes detection sensor (camera for eyes detection 20), or predicted by detecting the direction of the driver's head with the camera located in the vehicle compartment (not illustrated).

In step ST414, the ECU 30 determines whether or not the driver's eyes direction has become identical to the directions of these two objects at least one time.

When it is determined in the step ST414 that "it has become identical" (YES in the determination step ST414)," the control sequence proceeds to step ST416, where the ECU 30 sets the eyes guidance indication flag to 0, thereby ending the eyes-guidance processing.

Meanwhile, when it is determined in the step ST404 that "it has not become identical" (NO in the step ST414), the control sequence proceeds to step ST415, where the ECU 30 sets the eyes guidance indication flag to 1, thereby starting the eyes-guidance processing.

Figure 10:
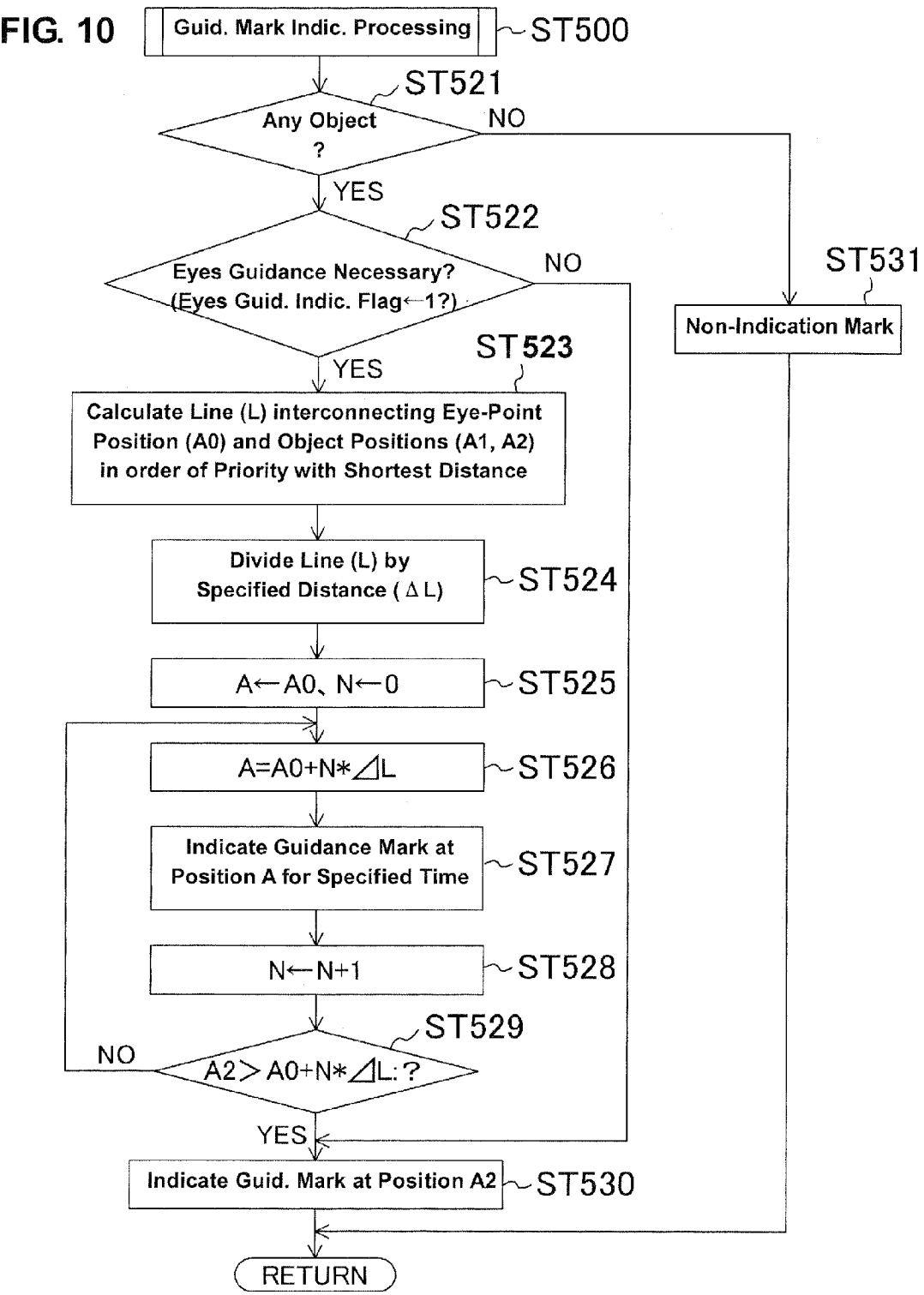
FIG. 10 is a flowchart showing a specific processing flow of the guidance-mark indication processing ST500 according to the second embodiment of the present invention.

Thus, the eyes-guidance start determination processing ST400 is executed. Subsequently, the guidance-mark indication processing is executed in step ST500 shown in FIG. 2. FIG. 10 shows a specific processing flow of the guidance-mark indication processing ST500.

First, the ECU 30 determines in step ST521 whether there exists any object for the guidance-mark indication processing or not.

When there exists no such object (NO in the step ST521), the control sequence proceeds to step ST531, where the ECU 30 sets the guidance mark to non-indication. Meanwhile, when there exists such object (YES in the step ST521), it proceeds to step ST522, where the ECU 30 checks the eyes-guidance indication flag. When this flag is 1, it proceeds to step ST523. When this flag is 0, it proceeds to step ST530.

Figure 11:
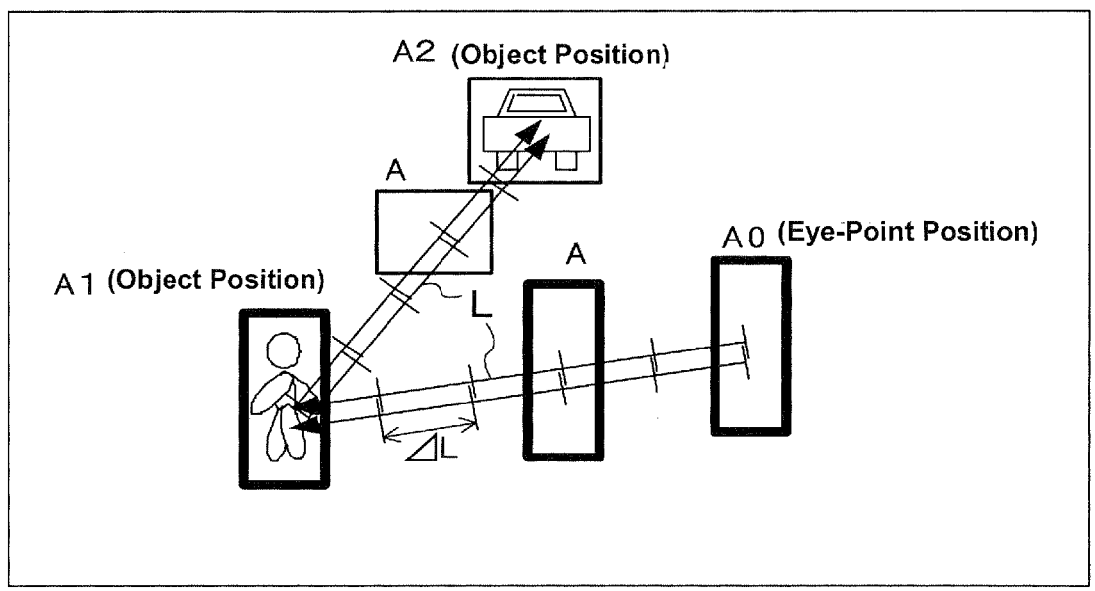
FIG. 11 is another example of the guidance mark indicated on the windshield display.

When the eyes-guidance indication flag is 1, the ECU 30 in the step ST523 obtains the eye-point position (A0) of the driver in the indication area on the windshield by the windshield display 40 based on the eyes direction calculated in the step ST413. Also, the ECU 30 obtains respective positions (A1, A2) of the two objects in the indication area on the windshield by the windshield display 40 based on the directions of the two objects calculated in the step ST412. Herein, the two objects are set to a pedestrian and another vehicle, the pedestrian having the highest priority. The position of the pedestrian is set to A1, and the position of the vehicle is set to A2. And, the ECU 30 calculates a line (L) that interconnects the eye-point position (A0), the object's position (A1), and the object's position (A2) in order of priority with the shortest distance, as shown in FIG. 11.

Then, the ECU 30 divides the above-described line (L) by a specified distance (ΔL) in step ST524. The value of ΔL depends on the degree of danger (priority) of the object so that the higher the degree of danger (priority) is, the greater the value of ΔL.

Next, the ECU 30 sets A to A0, N to 0, respectively (ST525), and conducts a calculation of A=A0+N×ΔL (ST526).

The ECU 30 in step ST527 commands the windshield display 40 to indicate the guidance mark at the position A obtained in the step ST506 for a specified time. In response to this, the windshield display 40 indicates the guidance mark at a position corresponding to the above-described position A in the indication area on the windshield for a specified time. Accordingly, at first the guidance mark is indicated for the specified time at the driver's eye-point position (A0). Herein, the specified time may be set to 1-2 seconds, for example. Also, as shown in FIG. 8, the guidance mark may be changed according to the kind of the object, or the degree of danger (priority). Further, the shape, boldness, color, moving speed or the like of the guidance mark may be changed according to the degree of danger (priority).

Next, the ECU 30 lets N to be increment (ST528), then determines whether A2>A0+N×ΔL is met or not (ST529). This determination is the one as to whether the next-time indication position of the guidance mark A (=A0+N×ΔL) has reached to the indication position (A2) of the object or not.

When it is determined that A2>A0+N×ΔL is not met (NO in the step ST529), the processing of the steps ST526-ST528 are executed again. In this case, N has been increment, so the guidance mark is indicated at a position (A) which is closer to the object by ΔL than the previous indicated position (see FIG. 11).

Through repeated processing of the steps ST526-ST529, the guidance mark originally indicated at the driver's eye-point position (A0) on the windshield is changed in indication position gradually by the specified distance (ΔL) toward the object's position (A1), and then it is changed in indication position gradually by the specified distance (ΔL) from the object's position (A1) toward the object's position (A1) (see FIG. 11).

Meanwhile it is determined that A2>A0+N×ΔL is met (YES in the step ST529), the control sequence proceeds to step ST530, where the ECU 30 commands the windshield display 40 to indicate the guidance mark at the object's position (A2). In response to this, the windshield display 40 indicates the guidance mark at a position corresponding to the object's position (A2) in the indication area on the windshield (see FIG. 11).

According to the above-described guidance-mark indication processing ST500, the guidance mark is indicated at the driver's eye-point position (A0) on the windshield first, then the indication position of the guidance mark is changed by the specified distance (ΔL) toward the object's position (A1), subsequently the indication position of the guidance mark is changed by the specified distance (ΔL) from the object's position (A1) toward the object's position (A2), and finally the guidance mark is indicated at the object's position (A2) (see FIG. 11).

Further, according to the present embodiment, the sensor input processing ST200, the object picking-up processing ST300, the eyes-guidance start determination processing ST400, and the guidance-mark indication processing ST500 are repeated as shown in FIG. 2. And, the eyes-guidance indication flag is set to 1 unless the object's direction and the driver's eyes-direction are located within the specified range and the identical direction (ST414, ST415 of FIG. 9), and the guidance-mark moving indication processing (ST523-ST530 of FIG. 11) are repeated. Thus, the moving indication of the guidance mark is continued until the vehicle's driver gazes at the object, thereby the driver can be made recognize the object surely.

The present invention should not be limited to the above-described embodiments, and any other modifications and improvements may be applied within the scope of a sprit of the present invention.

What is claimed is:

1. A driving assist device for a vehicle, comprising:
   an object detection device to detect an object to be recognized around the vehicle;
   an eyes-direction specification device to specify a direction of driver's eyes; and
   a mark indication device to indicate a mark with a specified shape on a windshield of the vehicle,
   wherein the mark indication device comprises a driver's eyes-guidance means for guiding the driver's eyes to the object detected by the object detection device,
   the driver's eyes-guidance means comprises an eye-point position setting means for setting an eye-point position of the driver on the vehicle's windshield based on the direction of the driver's eyes specified by said eyes-direction specification device, an object-position setting means for setting a position of the object on the vehicle's windshield based on the object detected said object detection device, and a midway-position setting means for setting at least one midway position on the vehicle's windshield located between the eye-point position and the position of the object based on a distance between said position of the object and said eye-point position of the driver,
   the driver's eyes-guidance means further comprises a mark indication means for indicating the specified-shape mark on the vehicle's windshield at each of the eye-point position of the driver set by said eye-point position setting means, the midway set by said midway-position setting means, and the position of the object set by said object-position setting means for a specified time in order of the eye-point position of the driver, the midway position, and the position of the object.

2. The driving assist device for a vehicle of claim 1, wherein said mark indication means of the mark indication device is configured to continue to indicate the specified-shape mark until a vehicle driver gazes at the object.

3. The driving assist device for a vehicle of claim 1, wherein said mark indication means of the mark indication device is configured to change a shape of said specified-shape mark to be indicated in accordance with the kind of the object.

4. The driving assist device for a vehicle of claim 1, wherein said mark indication device further comprises a danger-degree determination means for determining a degree of danger of the object detected by said object detection device, and said mark indication means of the mark indication device is configured to change at least one of a shape, color and moving speed of said mark to be indicated in accordance with the degree of danger of the object determined by said danger-degree determination means.

5. The driving assist device for a vehicle of claim 1, wherein said object detected by the object detection device is at least one of a pedestrian, another vehicle, a traffic signal, an intersection, and a cross walk.

6. The driving assist device for a vehicle of claim 1, wherein said mark indication device further comprises a danger-degree determination means for determining a degree of danger of the object detected by said object detection device, and said mark indication device is configured so that in case a plurality of objects to be recognized are detected by said object detection device, said mark indication means is configured to indicate the specified-shape mark for each of the plurality of objects in order of the higher degree of danger of the objects determined by said danger-degree determination means.

7. The driving assist device for a vehicle of claim 6, wherein said danger-degree determination means determines the degree of danger of the objects in accordance with the kind of objects and a distance between the objects and the vehicle.

* * * * *